United States Patent [19]

Schmidt

[11] Patent Number: 5,440,129
[45] Date of Patent: Aug. 8, 1995

[54] DETECTOR FOR HIGH-ENERGY RADIATION

[75] Inventor: Martin Schmidt, Emskirchen, Germany

[73] Assignee: Siemens Aktiengesellschaft, Munich, Germany

[21] Appl. No.: 283,192

[22] Filed: Aug. 4, 1994

[30] Foreign Application Priority Data

Oct. 11, 1993 [DE] Germany .................. 43 34 594.8

[51] Int. Cl.⁶ .................. G01T 1/20; G01T 1/24
[52] U.S. Cl. .................. 250/366; 250/368; 250/370.11
[58] Field of Search .......... 250/366, 367, 368, 370.11

[56] References Cited

U.S. PATENT DOCUMENTS 4,694,177 9/1987 Akai .

FOREIGN PATENT DOCUMENTS

| 55-142262 | 11/1980 | Japan | 250/370.11 |
| 57-172272 | 10/1982 | Japan | 250/370.11 |
| 58-153190 | 9/1983 | Japan | 250/368 |
| 60-115886 | 6/1985 | Japan | 250/370.11 |
| 62-76478 | 4/1987 | Japan | |

OTHER PUBLICATIONS

Patents Abstract of Japan, P-1122, Oct. 25, 1990, vol. 14/No. 490, Japanese Koiki No. 2-201288.

*Primary Examiner*—Constantine Hannaher
*Assistant Examiner*—Edward J. Glick
*Attorney, Agent, or Firm*—Hill, Steadman & Simpson

[57] ABSTRACT

A detector for computer tomography or digital radiography has an optimum efficiency and an optimum signal-to-noise ratio, and the thickness of the acquired x-ray beam can be selected in a simple way. The detector is formed by a row of parallel, bar-shaped scintillators. Every scintillator has a row of optical conductors extending in the longitudinal direction of the scintillator allocated to it. The optical conductors of a scintillator are separated from one another by slots, with the slots between the optical conductors of neighboring scintillators being in registry. Chips carrying photodiodes are plugged into the slots. Every scintillator together with the allocated optical conductors is surrounded by a reflector.

5 Claims, 1 Drawing Sheet

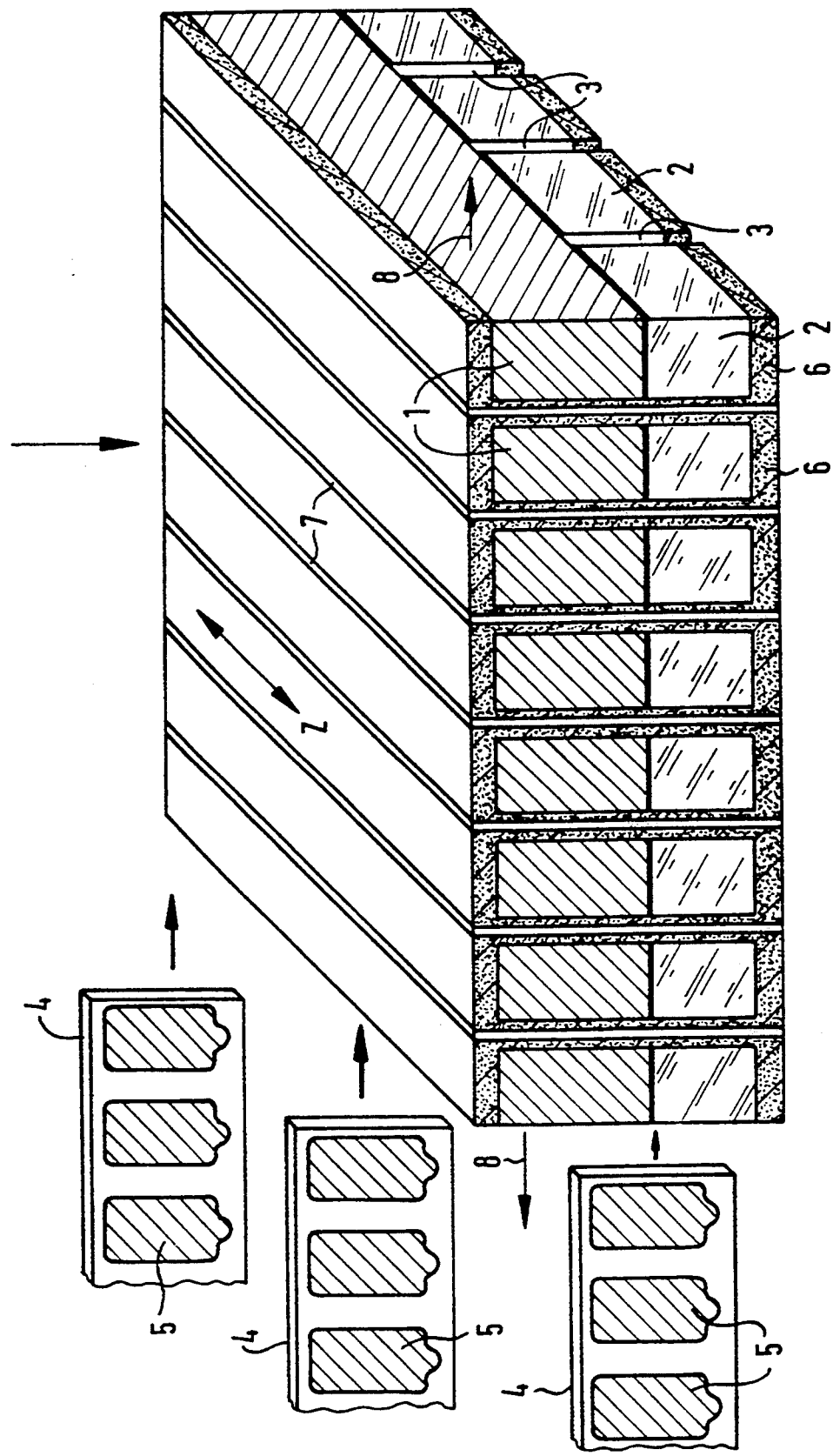

DETECTOR FOR HIGH-ENERGY RADIATION

BACKGROUND OF THE INVENTION

1. Field of the Invention

The present invention is directed to a detector for high-energy radiation of the type used in a computed tomography apparatus or digital radiography.

2. Description of the Prior Art

Detectors for high-energy radiation are known that are composed of a series connection of scintillators and photodiodes. Each detector has one scintillator and a maximum of two photodiodes disposed in successive planes as viewed in the radiation propagation direction. Such detectors are employed, for example, in computed tomography.

SUMMARY OF THE INVENTION

An object of the invention is to provide a detector of the type initially cited that is optimum in view of efficiency and signal-to-noise ratio, and with which it is possible to optionally acquire individual, thin x-ray beams, or a plurality of thin x-ray beams lying behind one another, or thick x-ray beams.

The above object is achieved in a detector for computer tomography or digital radiography constructed in accordance with the principles of the present invention, formed by a row of parallel, bar-shaped scintillators, each scintillator having a row of optical conductors allocated thereto, extending in the longitudinal direction of the scintillator. The optical conductors of each scintillator are separated from each other by slots, with the slots between the optical conductors of neighboring scintillators being in registry. Chips carrying photodiodes are plugged into the slots. Each scintillator and its allocated optical conductors are surrounded by a reflector.

DESCRIPTION OF THE DRAWINGS

The single figure is a perspective view, partly in section, of a detector for high-energy radiation constructed in accordance with the principles of the present invention, illustrating the manner of insertion of photodiode-carrying chips into a detector module.

DESCRIPTION OF THE PREFERRED EMBODIMENTS

The drawing shows a module of a detector for high-energy radiation, particularly x-radiation. The radiation is incident on the module from above. The module has a series (row) of bar-shaped scintillators 1 lying parallel to one another. A row of optical conductors 2 is in optical contact with every scintillator 1. The optical conductors 2 are separated from one another by slots 3. The slots 3 between the optical conductors 2 of neighboring scintillators 1 are in registry, so that it is possible to insert chips 4 into the slots 3 of the illustrated module, a series (row) of photodiodes 5 being applied on each such chip 4. Every photodiode 5 is consequently in optical contact with an optical conductor 2. Every scintillator 1 with the allocated optical conductors 2 is surrounded by a reflector 6.

Tapping the signals of the photodiodes 5 can ensue by means of a printed circuit board (not shown) at the underside of the module. The sub-signals of the photodiodes 5 of a scintillator 1 can thereby be interconnected, so that a relatively large slice thickness of the acquired x-ray beam arises. The sub-signals, however, can also be individually evaluated, so that a plurality of parallel slices of an x-ray beam can be acquired. Given a thin slice, only one sub-signal can also be acquired and evaluated.

The following are suitable as materials for the reflectors 6 epoxy glues filled with titanium oxide or with lead (11) hydroxy carbonate in arbitrary mixing ratios. An optimum optical decoupling is achieved when reflective metallic layers 7 are respectively arranged between two scintillators 1 with the allocated optical conductors 2.

The optical conductors 2, which are arranged directly under the scintillators 1, should be largely matched to the scintillation material in terms of their refractive index and in terms of their thermal expansion. Thus, glass having a high refractive index is advantageous for use with scintillator 1 of $CdWO_4$, GYO and $Gd_2O_2S$. Optical plastics are suitable for scintillators 1 of luminescent foils and cesium iodide. It is advantageous to fashion the outermost optical conductors 2 somewhat longer in the Z-direction than the allocated scintillator 1, in order to compensate a signal drop at the end of the scintillator 1.

The number of photodiode rows, i.e. of chips 4, is arbitrary. Given a single-sided arrangement of the photodiodes 5 on a silicon chip, the back side is mirrored for optical reasons. When a metallic mirroring is selected, this can simultaneously form the ground contact for the photodiodes. The employment of two photodiodes per layer (or slice) is advantageous for reasons of light energy, whereby these photodiodes can be applied by vapor deposition in an a-Si technique on a thin glass substrate at the front and back side. Fundamentally, the thickness of the photodiode row should be as small as possible, for example 100 $\mu$m. The active surfaces of the photodiodes 5 cover the ends of the optical conductors, whereby the active surface of a photodiode 5 can be of practically the same size as the exit face of the optical conductor 2, this being advantageous in view of the light yield.

Given the illustrated detector, the signals from the slices having the allocated photodiodes 5 can be individually calibrated. Differences in the homogeneity of the material in each slice can thus be individually measured and can also be corrected, even when the output signals of a plurality of thin slices of the x-radiation are combined to form a thick slice of the x-radiation.

The photodiodes 5 have substantially no x-radiation incident thereon, so that direct conversion in the silicon does not occur; this would lead to elevated noise and would lead to image errors in that case wherein the output signals of the photodiodes 5 serve the purpose of image generating.

A further advantage of the illustrated detector is the small diode area, even given a large number of chips 4 and long Z-lengths. A small diode area results in a low capacitance of the photodiodes 5 and a low dark current. This is important for the signal gain since the capacitance and the dark current influence the electronic noise in the amplifier.

The illustrated module of a detector of the invention is composed of eight channels. Modules having a different channel number, for example with 4, 16 or 32 channels are also possible. A plurality of such modules can be united to form a radiation-electrical transducer for imaging in computer tomography or in digital radiography, such that all scintillators of the modules lie in series parallel to one another. A plurality of such modules are thus connected to one another in the direction of the arrows 8.

The modular structure is advantageous for economical reasons. Thus, individual modules that do not meet the specification or fail during operation can be replaced.

A further advantage of this arrangement is that the noise in thin slices is lower than currently known detectors. When, given thin slices, only one or two photodiodes are driven to collect light, the capacitive noise part and the noise part in the image caused by dark current are lowered. Given a higher signal, i.e. a thicker slice, photodiodes are correspondingly added in. The noise part in the image always remains proportionally identical.

Although modifications and changes may be suggested by those skilled in the art, it is the intention of the inventor to embody within the patent warranted hereon all changes and modifications as reasonably and properly come within the scope of his contribution to the art.

I claim as my invention:

1. A detector for high-energy radiation comprising:
   a row of parallel, bar-shaped scintillators, each scintillator having a longitudinal direction;
   a row of optical conductors for each scintillator, wherein each row of optical conductors extends in said longitudinal direction and is in optical contact with a respective scintillator, said optical conductors of each row being separated from each other by slots, with the slots between the optical conductors of neighboring scintillators being in registry;
   a plurality of chips, each chip having photodiodes thereon, respectively disposed in said slots with each photodiode being in optical contact with an optical conductor; and
   a reflector surrounding each scintillator and the optical conductors in optical contact therewith.

2. A detector as claimed in claim 1 further comprising a metallic layer disposed between neighboring reflectors.

3. A detector as claimed in claim 1 wherein each chip comprises a silicon chip carrying a row of photodiodes on one side thereof, and carrying a reflective metal layer on an opposite side thereof, said reflective metal layer comprising a ground contact for said photodiodes.

4. A detector as claimed in claim 1 wherein each chip carries respective rows of photodiodes on both sides thereof.

5. A detector as claimed in claim 1 wherein each chip comprises a glass carrier, and wherein said photodiodes comprise photodiodes vapor-deposited on both sides of said glass carrier.

* * * * *